UNITED STATES PATENT OFFICE.

HERBERT H. DOW, OF MIDLAND, MICHIGAN, ASSIGNOR TO THE DOW CHEMICAL COMPANY, OF MIDLAND, MICHIGAN, A CORPORATION OF MICHIGAN.

METHOD OF REMOVING WATER OF CRYSTALLIZATION FROM MAGNESIUM CHLORID.

1,389,546.     Specification of Letters Patent.     Patented Aug. 30, 1921.

No Drawing.     Application filed September 24, 1919. Serial No. 325,870.

*To all whom it may concern:*

Be it known that I, HERBERT H. Dow, a citizen of the United States, and a resident of Midland, county of Midland, and State of Michigan, have invented a new and useful Improvement in Methods of Removing Water of Crystallization from Magnesium Chlorid, of which the following is a specification, the principle of the invention being herein explained and the best mode in which I have contemplated applying that principle, so as to distinguish it from other inventions.

The difficulties encountered in removing water of crystallization from magnesium chlorid, which ordinarily crystallizes out with six molecules of water ($MgCl_2.6H_2O$), are well understood, said difficulties being, in the main, due to the fact that this material will melt slightly above 100 degrees, and in a melted condition does not appreciably dehydrate itself at any temperature that can be applied below the point where decomposition sets in.

The present improved process or method is based on the discovery that by taking a chlorid which has been more nearly dehydrated, for example the di-hydrate ($MgCl_2.2H_2O$), and admixing the same with the normal hexa-hydrate under such conditions that the molecules of water will distribute themselves, so to speak, gives, as a result, the tetra-hydrate which will stand a much higher temperature than the hexa-hydrate without melting and better lends itself to further dehydration.

The invention, then, consists of the steps hereinafter fully described and particularly pointed out in the claims, the following description setting forth in detail one mode of carrying out the invention, such disclosed mode illustrating, however, but one of various ways in which the principle of the invention may be used.

The method and means by which an initial stock or supply of magnesium chlorid, low in water of crystallization, for example the di-hydrate, may be produced, is a matter of indifference. It is, however, possible to obtain the particular hydrate named by methods known to chemists. Further and final dehydration, so far as known, can only be accomplished by heating the material to a relatively high temperature in an atmosphere of hydrochloric acid gas, or some chemically equivalent process such as heating with $NH_4Cl$.

According to the present process, a measured quantity of previously prepared solid di-hydrate is admixed with fused hexa-hydrate, in equal molecular proportions, so as to give the equivalent of twice the quantity of an intermediate hydrate, for example the tetra-hydrate. The di-hydrate may be heated to nearly the maximum temperature it will withstand, while the temperature of the normal hydrate is below that at which decomposition occurs. The mixture may be stirred, at least initially, but quickly sets into a solid mass, consisting of the tetra-hydrate or other predetermined intermediate. Such solid mass can then be broken up, or crushed, and heated to the necessary higher temperature (approximately 180° C.) to drive off two more molecules of water, and give the di-hydrate.

The temperatures given above refer to heating at ordinary atmospheric pressure, and not under vacuum. It has already been indicated that the tendency to decompose in heating the tetra-hydrate as stated is very much less than in heating the normal hydrate at the lower temperature. The advantage of the present method or process over any at present used will accordingly be apparent. It is of course necessary to continuously or intermittently return to the first step a portion of the product resulting from the second step, but obviously no loss in efficiency is involved.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method of removing water of crystallization from normal magnesium chlorid, containing six molecules of water, the step which consists in interfusing therewith partially dehydrated magnesium chlorid, substantially as described.

2. In a method of removing water of crystallization from normal magnesium chlorid containing six molecules of water, the step which consists in interfusing therewith sufficient of the di-hydrate to produce an intermediate hydrate containing less than six molecules of water, substantially as described.

3. In a method of removing water of crystallization from normal magnesium chlorid containing six molecules of water, the step which consists in interfusing therewith sufficient of the di-hydrate to convert the whole into the tetra-hydrate, substantially as described.

4. In a method of removing water of crystallization from normal magnesium chlorid containing six molecules of water, the steps which consist in admixing therewith while in fused condition an equivalent quantity of the di-hydrate, whereupon the whole is converted into the tetra-hydrate, substantially as described.

5. In a method of removing water of crystallization from normal magnesium chlorid containing six molecules of water, the steps which consist in admixing therewith while in fused condition an equivalent quantity of the di-hydrate, the latter being heated to a temperature just short of that at which it decomposes, whereupon a solid body of the tetra-hydrate is formed, substantially as described.

6. The method of removing water of crystallization from normal magnesium chlorid, containing six molecules of water, which consists in interfusing therewith sufficient of the di-hydrate to convert the whole into the tetra-hydrate, and then heating the latter in air at a relatively elevated temperature to produce the di-hydrate.

7. The method of removing water of crystallization from normal magnesium chlorid, containing six molecules of water, which consists in interfusing therewith sufficient of the di-hydrate to convert the whole into the tetra-hydrate, breaking up the resulting solid compound, and then heating at once to the higher temperature which such tetra-hydrate will withstand without decomposition.

8. The method of removing water of crystallization from normal magnesium chlorid, containing six molecules of water, which consists in interfusing therewith sufficient of the di-hydrate to convert the whole into the tetra-hydrate, heating the latter in air at a relatively elevated temperature to produce the di-hydrate, then using a portion of such di-hydrate to mix with a further quantity of normal chlorid and repeating the steps as before.

Signed by me, this 19th day of September, 1919.

HERBERT H. DOW.